April 15, 1930.  S. L. FISHER  1,754,618
CONNECTING ROD FOR AIR PUMPS
Filed April 4, 1927  2 Sheets-Sheet 1

Inventor
Stanley L. Fisher
By Rockwell & Bartholow
Attorneys

April 15, 1930.  S. L. FISHER  1,754,618
CONNECTING ROD FOR AIR PUMPS
Filed April 4, 1927    2 Sheets-Sheet 2

Inventor
Stanley L. Fisher
By Rockwell & Bartholow
Attorneys

Patented Apr. 15, 1930

1,754,618

UNITED STATES PATENT OFFICE

STANLEY L. FISHER, OF CHESTER, CONNECTICUT, ASSIGNOR TO PRATT READ PLAYER ACTION COMPANY, OF DEEP RIVER, CONNECTICUT

CONNECTING ROD FOR AIR PUMPS

Application filed April 4, 1927. Serial No. 180,873.

My invention relates to a connecting rod for an air exhauster and more particularly to an air exhauster suitable for use in a pneumatically operated player piano.

One common form of the air exhauster for use in pianos of this type consists of a frame having a series of bellows pumps mounted thereon and actuated by a centrally located power driven crank member having a series of connecting rods rotatably mounted thereon, with their outer ends in operative engagement with the movable leaves of the bellows. When during the operation of the exhauster the connecting rod bearings wear, the movement of the connecting rods on their bearing supports produces that form of noise known as knocking, which is highly objectionable in a musical instrument of this type. It has been proposed to eliminate this knocking by replacing the ordinary connecting rods with strips of flexible material, such as woven fabric belting, each strip having one end rigidly attached to a movable leaf of one of the bellows and the other end rigidly attached to a common rotary member mounted on the crank pin. It has been found in practice, however, that due to the constant flexing of the fabric strips they wear out in a short time and break at the point of flexure.

As one of the main objects of my invention, I propose to provide a connecting rod for an air exhauster of this type, in which the bearings are made of sound deadening material, so that when the bearings wear no audible knocking or other noise will take place.

Another object of my invention is to provide a bearing of this type in which there is provision for taking up wear.

An additional object of my invention is to provide in a device of this type an improved mounting for the connecting rods on the crank pin, in which all the connecting rods act in the same plane.

A further object of my invention is to provide a simple but adequate oiling means for the connecting rod bearings.

A still further object of my invention is to provide an improved mounting for the connecting rods at the point where they are attached to the bellows.

To these and other ends the invention consists in the novel features and combination of parts to be hereinafter described and claimed.

Figure 1:
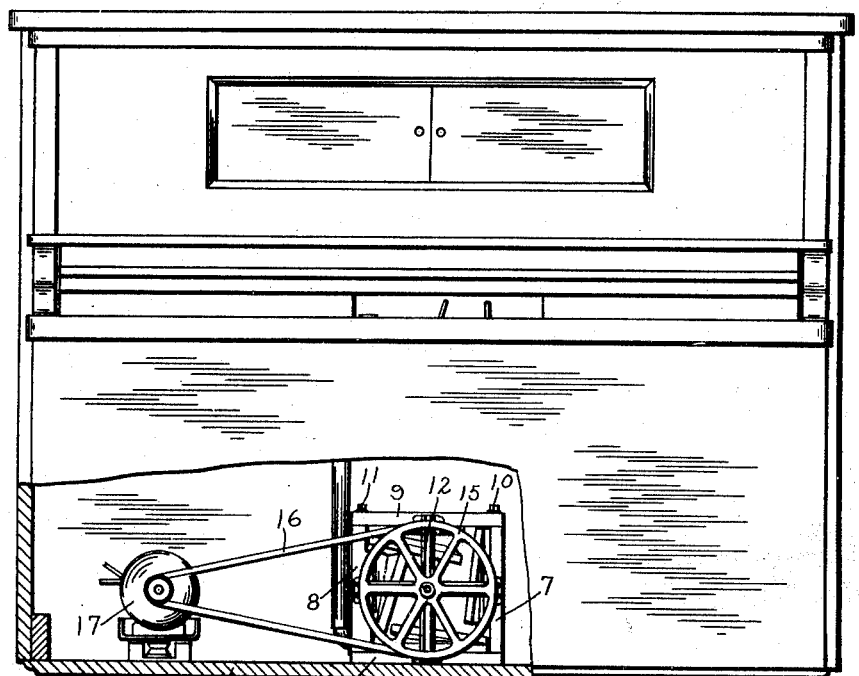
Fig. 1 is a front elevation of a player piano having the lower front panel broken away to show the air exhauster and its driving means.
Figure 2:
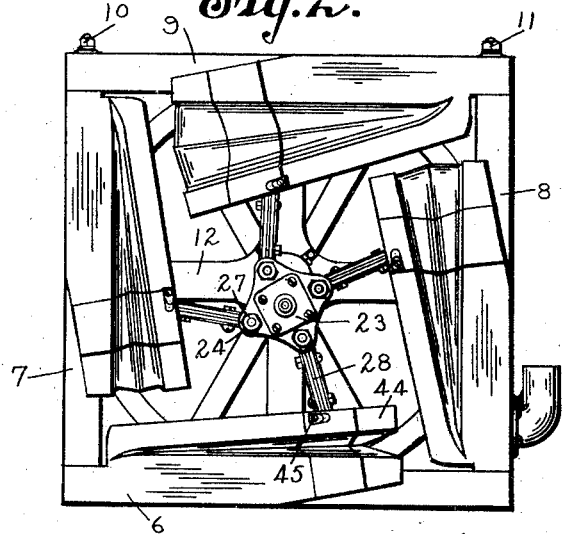
Fig. 2 is a general view of the air exhauster on a larger scale than Fig. 1.
Figure 3:
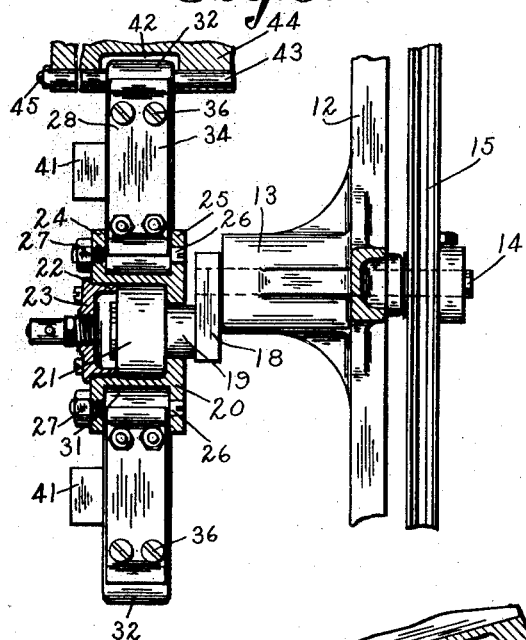
Fig. 3 is a view of the crank and connecting rod assembly.

Referring now to the drawings in detail, my air exhauster comprises a base 6, side members 7 and 8, and a top member 9, secured together by bolts 10 and 11. Secured on the members 6, 7, 8 and 9 is a spider 12 having therein a bearing 13, for a shaft 14, adapted to be rotated by a pulley 15, secured thereon and connected by a belt 16, to suitable power means, such as an electric motor 17. On the other end of the shaft 14, is a crank 18, having a crank pin 19. A frog 20 is rotatably mounted on crank pin 19, by means of an antifriction bearing 21, secured within the frog 20, by the annular flange 22 of the cover plate 23. The frog 20 has a series of oppositely disposed pairs of arms 24 and 25, having mounted therein connecting rod pins 26, each having a threaded end engaged in the arm 24, and secured against movement therein by a lock nut 27.

Figure 4:
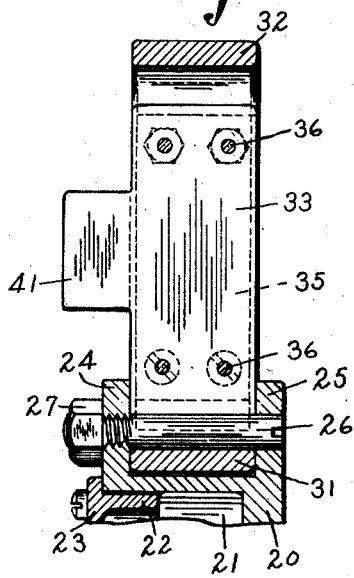
Fig. 4 is a sectional view of the improved connecting rods taken along the line 4—4 of Fig. 5.
Figure 5:
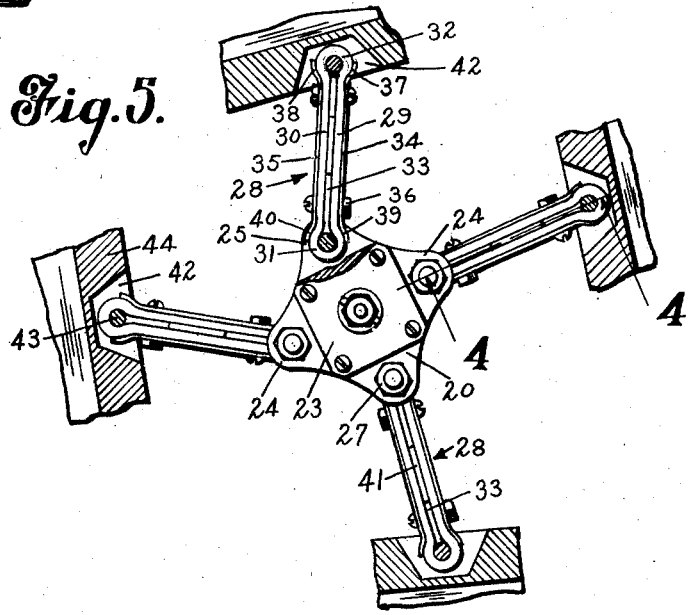
Fig. 5 is another view of the connecting rod assembly at right angles to that shown in Fig. 3.

The connecting rods are designated in general by the reference numeral 28, and are preferably made of one or more strips of tough but pliable material emitting very little sound even upon severe percussion. In practice, I have found that woven fabric belting has these characteristics and in the preferred form of my invention this material is impregnated with gutta percha or balatta, and then molded while hot into the form shown in the drawings, comprising two relatively long separated central portions 29 and 30, having ends 31 and 32, in the form of cylindrical loops. Between the central portions of the belting is inserted a strip of felt 33, or other material capable of absorbing a lubricant, and having its ends extended to the loops 31 and 32, and closing the open ends thereof so as to form in cooperation with the loops substantially cylindrical bearings. On the outer sides of the long central portion of the belting are metallic plates 34 and 35, having a series of bolts 36, four being shown, passing through the plates 34 and 35, the central portions of the belting 29, and 30 and felt 33, and adapted to secure the whole together in a rigid manner. On the ends of the metallic plates 34 and 35 are portions 37, 38, 39 and 40 extending outwardly therefrom and bent in conformity with the outer surfaces of the loops 31 and 32, with which they are adapted to be maintained in tight contact. Side portions 41, of the felt 33, are formed integrally therewith and extend laterally therefrom, as as shown particularly in Fig. 4, and are adapted to receive a lubricant which will be be carried through the felt to the bearings in well known manner.

The movable leaves of the bellows have recesses 42, formed therein for the reception of the outer ends of connecting rods 28, which are secured in the openings by means of pins 43, passing through the movable leaves of the bellows, and being received within the bearing formed in the loops 32 of the connecting rods 28. In order to prevent displacement of the pins 43, in the movable leaves 44, one of the ends of the pins is bent at right angles and has its bent portion secured to the movable leaf 44, by suitable means, as for instance a screw 45.

The valves and other members of the bellows may be of any well known type and are not herein shown in detail.

In use, the improved air exhauster may be mounted in a player piano in any desired manner, herein shown, secured to the baseboard 46. Upon power being supplied to the motor 17, the rotation of the latter through the agency of the belt 16 and pulley 15, will cause a rotation of shaft 14, and crank 18. The frog 20 will be carried around in an annular path by the crank pin 19, contrained against rotation on its own axis by the connecting rods 28. The movement of the frog 20, in its annular path will cause the reciprocation of the connecting rods in well known manner, and through the movement of the connecting rods the movable leaves of the bellows are caused to oscillate.

Upon any wear occurring in the connecting rod bearings no audible knocking takes place, due to the sound deadening effect of the fabric belting of which the bearings are made. In addition, such wear may be readily taken up by tightening the bolts 36, which brings the ends of the loops closer together, partly through the cooperation of the bent end portions of the plates which are in engagement with the loops. The connecting rod bearings are adapted to be readily lubricated by means of the felts provided and the side portions of the felts may be readily engaged by the nose of an oil can or other suitable lubricating device.

In the improved means for attaching the connecting rods to the crank pin all the thrust members are acting in the same plane, which not only transmits the power to the bellows in an efficient manner but is highly instrumental in reducing wear in the connecting rod bearings by eliminating any tendency of the connecting rods to move along the connecting rod pins in an axial direction, and since the connecting rods are arranged in opposite pairs with their lines of thrust in the same plane at right angles to the crank pin, any bending movement on the crank pin or connecting rod pins is eliminated. The means for securing the connecting rods to the movable leaves of the bellows is simple but highly efficient, and provides means for readily assembling the connecting rods upon the movable leaves or disconnecting the same therefrom.

While I have shown and described a preferred embodiment of my invention as applied to an air exhauster, the invention is not limited thereto but may be used in other devices where noise is objectionable, and while the material for the bearings is described as woven fabric, it is readily understood that other materials having the same sound deadening effect may be used in place thereof, and it will be understood that the invention is not limited to all the details shown, but is capable of modification and variation, within the spirit of the invention and within the scope of the appended claims.

It will of course be understood that the improvements herein described and claimed will be readily applicable to pressure pumps as well as exhaust pumps.

What I claim is:

1. A connecting rod for an air pump or the like, comprising a rigid central body portion and bearings on the opposite ends thereof and extending substantially freely outwardly therefrom, said bearings being wholly composed of sound deadening material.

2. A connecting rod for an air pump or the like, comprising a rigid body member and a strip of pliable sound-deadening material wrapped upon itself to form an annular bearing member at its intermediate portion, and having its ends secured in the body member with the annular bearing member extending outwardly therefrom.

3. A connecting rod for an air pump or the like, comprising a rigid central body portion and bearings composed wholly of pliable material formed on the ends thereof, said bearings being supported adjacent the central body portion only.

4. A connecting rod for an air pump or the like, comprising a rigid central body portion and bearings on the ends thereof, said bearings being composed of pliable sound deadening material impregnated with stiffening material molded to shape.

5. A connecting rod for an air pump or the like, comprising a rigid central body portion and bearings on the ends thereof, said bearings being made of woven fabric impregnated with gutta percha and molded into shape.

6. A connecting rod for an air pump or the like, comprising a rigid central body portion, a bearing at the end thereof, said bearing being wholly composed of woven fabric attached to said central body portion and extensions on said body portion between which said bearing is received.

7. A connecting rod for an air pump or the like, comprising a rigid body member and a strip of pliable sound-deadening material wrapped upon itself to form an annular bearing member at its intermediate portion, and having its ends secured to the body member, said material being impregnated with stiffening material and molded into shape to form a cylindrical bearing.

8. In a connecting rod for an air pump or the like, a central body portion, and bearings at the ends thereof, said bearings consisting of annular bands of sound deadening material secured to the central body portion and extending freely outwardly therefrom.

9. In a connecting rod for an air pump or the like, a central body portion, and bearings at the ends thereof, said bearings consisting of annular bands of woven fabric.

10. In a connecting rod for an air pump or the like, a central body portion, bearings at the ends thereof, said bearings consisting of annular bands of sound deadening material, and a lubricant carrying member supported by the body portion of the rod and extending into and forming a part of the bearings.

11. In a connecting rod for an air pump or the like, a central body portion, bearings at the ends thereof, said bearings consisting of annular bands of sound deadening material, means for taking up wear in said bearings, and means for lubricating said bearings, said lubricating means being carried by the connecting rod and extending into the bearing openings.

12. A connecting rod for an air pump or the like, comprising a central body portion of sound deadening material, end bearings formed integrally therewith, and means for supporting said central body portion in a rigid manner.

13. A connecting rod for an air pump or the like, comprising a central body portion of sound deadening material, said body portion being formed of two parallel strips of said material, bearings formed on the ends of said strip and of said material, and means for securing said strips together at their central portions in a rigid manner.

14. A connecting rod for an air pump or the like, comprising a central body portion of sound deadening material, said body portion being formed of two parallel strips of said material, bearings formed on the ends of said strips and of said material, a lubricating wick interposed between said strips and extending to said bearings, and means for securing said strips together in a rigid manner.

15. A connecting rod for an air pump or the like, comprising a central body portion of sound deadening material, said body portion being formed of two parallel strips of said material, bearings formed on the ends of said strips and of said material, a lubricating wick interposed between said strips and extending to said bearings, and means for securing said strips together in a rigid manner, said means comprising metallic side plates, one on each side of said strips.

16. A connecting rod for an air pump or the like, comprising a central body portion of sound deadening material, said body portion being formed of two parallel strips of said material, bearings formed at the ends of said strips and of said material, a lubricating wick interposed between said strips and extending to said bearings, and means for securing said strips together.

17. A connecting rod for an air pump or the like, comprising a central body portion of sound deadening material, said body portion being formed of two parallel strips of said material, bearings formed on the ends of said strips and of said material, a lubricating wick interposed between said strips and extending to said bearings, means for securing said strips together in a rigid manner, said means comprising metallic side plates for said strips and extensions on said plates engaging said end bearings.

18. A connecting rod for an air pump or the like, comprising a central body portion of sound deadening material, said body portion being formed of two parallel strips of said material, bearings formed on the ends of said strips and of said material, a lubricating wick interposed between said strips and extending to said bearings, and means for securing said strips together in a rigid manner, said means comprising metallic side plates and means for adjusting said plates towards one another.

19. A connecting rod for an air pump or the like, comprising a central body portion of sound deadening material, said body portion being formed of two parallel strips of said material, bearings formed on the ends of said strips and of said material, a lubricating wick interposed between said strips and extending to said bearings, and means for securing said strips together in a rigid manner, said means comprising metallic side plates for said strips, and bolts passing through said side plates, strips and wicking.

20. A connecting rod for an air pump or the like, comprising a central body portion of sound deadening material, said body portion being formed of strips of said material, bearings formed on the ends of said strips and of said material, a lubricating wick interposed between said strips and extending to said bearings, a laterally extending side portion on said wick, rigid plates secured on the opposite sides of said strips from said wick, bolts passing through said rigid plates, strips and wick, and adapted to secure them together in a rigid manner, and outwardly extending end portions on said rigid plates, bent in conformity with the outer portions of said bearings and in close contact therewith.

21. A connecting rod for an air pump or the like comprising a substantially rigid central body portion, a bearing of non-metallic resilient material formed on an end thereof, an element received within said bearing, and extensions on said body portion engaging said bearing adjacent said body portion only and urging the bearing into contact with said element.

22. A connecting rod for an air pump or the like, comprising a pair of spaced metallic plates, sound deadening material received between said plates, and extending outwardly from the ends thereof to form bearings, and means for securing said plates and material rigidly together.

In witness whereof, I have hereunto set my hand this 1st day of April, 1927.

STANLEY L. FISHER.